(12) United States Patent
Luo

(10) Patent No.: US 7,912,659 B2
(45) Date of Patent: Mar. 22, 2011

(54) SYSTEM AND METHOD FOR MONITORING THE CONDITION OF A DRIVE TRAIN

(75) Inventor: Huageng Luo, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 532 days.

(21) Appl. No.: 10/878,072

(22) Filed: Jun. 28, 2004

(65) Prior Publication Data

US 2005/0284225 A1    Dec. 29, 2005

(51) Int. Cl.
*G01L 7/00* (2006.01)
*G01B 5/30* (2006.01)

(52) U.S. Cl. ........................................... 702/56; 702/35

(58) Field of Classification Search ............... 702/35, 702/36, 44, 54, 56, 75–77, 141, 142, 182, 702/183–185; 73/593, 659, 660
See application file for complete search history.

(56) References Cited

U.S. PATENT DOCUMENTS

| | | | | |
|---|---|---|---|---|
| 3,712,130 A | * | 1/1973 | Weichbrodt et al. ............ | 73/162 |
| 4,872,337 A | * | 10/1989 | Watts et al. ..................... | 73/162 |
| 4,931,949 A | | 6/1990 | Hernandez et al. | |
| 5,511,422 A | * | 4/1996 | Hernandez ...................... | 73/593 |
| 5,825,657 A | | 10/1998 | Hernandez ...................... | 702/77 |
| 6,053,047 A | | 4/2000 | Dister et al. .................... | 73/593 |
| 6,289,735 B1 | | 9/2001 | Dister et al. .................... | 73/579 |
| 6,425,293 B1 | * | 7/2002 | Woodroffe et al. ............. | 73/756 |
| 6,507,789 B1 | | 1/2003 | Reddy et al. | |
| 6,995,848 B2 | * | 2/2006 | Deck ............................. | 356/512 |
| 7,283,954 B2 | * | 10/2007 | Crockett et al. ............... | 704/216 |
| 2002/0062194 A1 | * | 5/2002 | Kliman et al. ................. | 702/35 |
| 2003/0015166 A1 | * | 1/2003 | Seymour .................... | 123/198 R |
| 2004/0200283 A1 | * | 10/2004 | Blunt ............................. | 73/593 |
| 2004/0237683 A1 | * | 12/2004 | Mikhail et al. ................ | 74/410 |

FOREIGN PATENT DOCUMENTS

| | | | |
|---|---|---|---|
| DE | 10144076 A1 | | 3/2003 |
| EP | 0889313 A2 | | 1/1999 |
| EP | 1300668 A1 | | 4/2003 |
| EP | 1 612 458 | * | 1/2006 |
| WO | WO 03056284 | | 7/2003 |

OTHER PUBLICATIONS

Boudreaux-Bartels et al., Discrete Fourier Transform Using Summation by Parts, IEEE, pp. 1827-1830, 1987.*
Reference RD136417/10789; Application No. 05253985.5-2421/1612458; Dated Aug. 12, 2009; Partial European Search Report; 6 Pages.

* cited by examiner

*Primary Examiner* — Michael P Nghiem
(74) *Attorney, Agent, or Firm* — Patrick K. Patnode

(57) ABSTRACT

A gearbox condition monitoring system includes at least one vibration sensor located on a gearbox casing. A processing unit is coupled to the vibration sensor and is configured to receive signals representative of the detected vibrations from the vibration sensor. The processing unit may be operable to process the signals representative of detected vibrations of gears and bearings and to compute at least one dynamic energy index or location of fault.

28 Claims, 3 Drawing Sheets

SYSTEM AND METHOD FOR MONITORING THE CONDITION OF A DRIVE TRAIN

BACKGROUND

The invention relates generally to techniques for monitoring the condition of a drive train, and more specifically to a technique for monitoring the condition of gears and bearings within a gearbox of a drive train.

A gear is a machine part that is designed to mesh with another similar machine part to transmit rotational motion. The most commonly used gears include planetary gears, spur gears, helical gears, bevel gears, worm gears, and rack and pinion gears. Gears mesh with each other in many different ways to transfer motion from one gear to another. In addition, gears can be used to increase or decrease the speed of rotation. For example, a smaller gear driven by a larger gear will have a greater speed of rotation than the larger gear. Conversely, a larger gear driven by a smaller gear will have a lower speed of rotation than the smaller gear. Gears may be housed in a gearbox. Gearboxes are used to transmit rotational motion in many different types of systems. A gearbox typically consists of at least one gear set and bearings to enable the gears to rotate.

The gears and bearings in a gearbox may have defects, or they may fail over time, or they may simply wear out. For example, the loads and stresses that are imposed on the bearings and gears may exceed acceptable limits, leading to failure or damage to the gears or bearings. The damaged or failed components may be replaced once their existence is known. Alternatively, the teeth may simply begin to wear down through prolonged usage.

Vibration analysis is an established non-intrusive technique for monitoring the condition of mechanical components within rotating machines. For example, the condition of a component may be determined by considering the frequency and magnitude of vibration signals produced by the component. Generally, components in good condition, e.g., gears with complete sets of teeth, produce smaller amplitude vibrations than components in poor condition, e.g., gears with chipped or missing teeth. The frequencies of the vibrations produced by the gears are unique to the gear design and shaft rotation speed. One conventional technique of vibration analysis involves measuring a critical frequency of a vibration-generating component and measuring the amplitude of the vibration signal at more than one harmonic frequency of the critical frequency, then comparing the amplitudes to the amplitudes of vibration signals at adjacent harmonic frequencies. However this method may not be practical because the resonance frequency is variable.

Accordingly, there is a need for a technique for accurately detecting and identifying gear-meshing faults and bearing faults in a gearbox.

BRIEF DESCRIPTION

In accordance with one aspect of the present technique, a gearbox monitoring system is provided to detect gear and bearing faults so as to protect the rotating electric machine from damage. The gearbox condition monitoring system comprises a plurality of vibration sensors located at predetermined locations on a gearbox casing. A processing unit is coupled to the plurality of vibration sensors and are configured to receive the electronic signals representative of the detected vibrations. The processing unit comprises a fast fourier transform for processing the signals representative of detected vibrations of gears and bearings and to compute plurality of dynamic energy indexes or location of fault.

In accordance with another aspect of the present technique, a method of identifying an abnormal vibration in a gear system is provided. The method comprises generating a signal representative of the detected gearbox vibrations and processing the signal representative of the detected vibrations of gears and bearings to compute a plurality of dynamic energy indexes. The method also comprises normalizing the dynamic energy indexes and comparing the normalized dynamic energy index to a reference value to establish whether the gearbox vibrations are normal or abnormal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
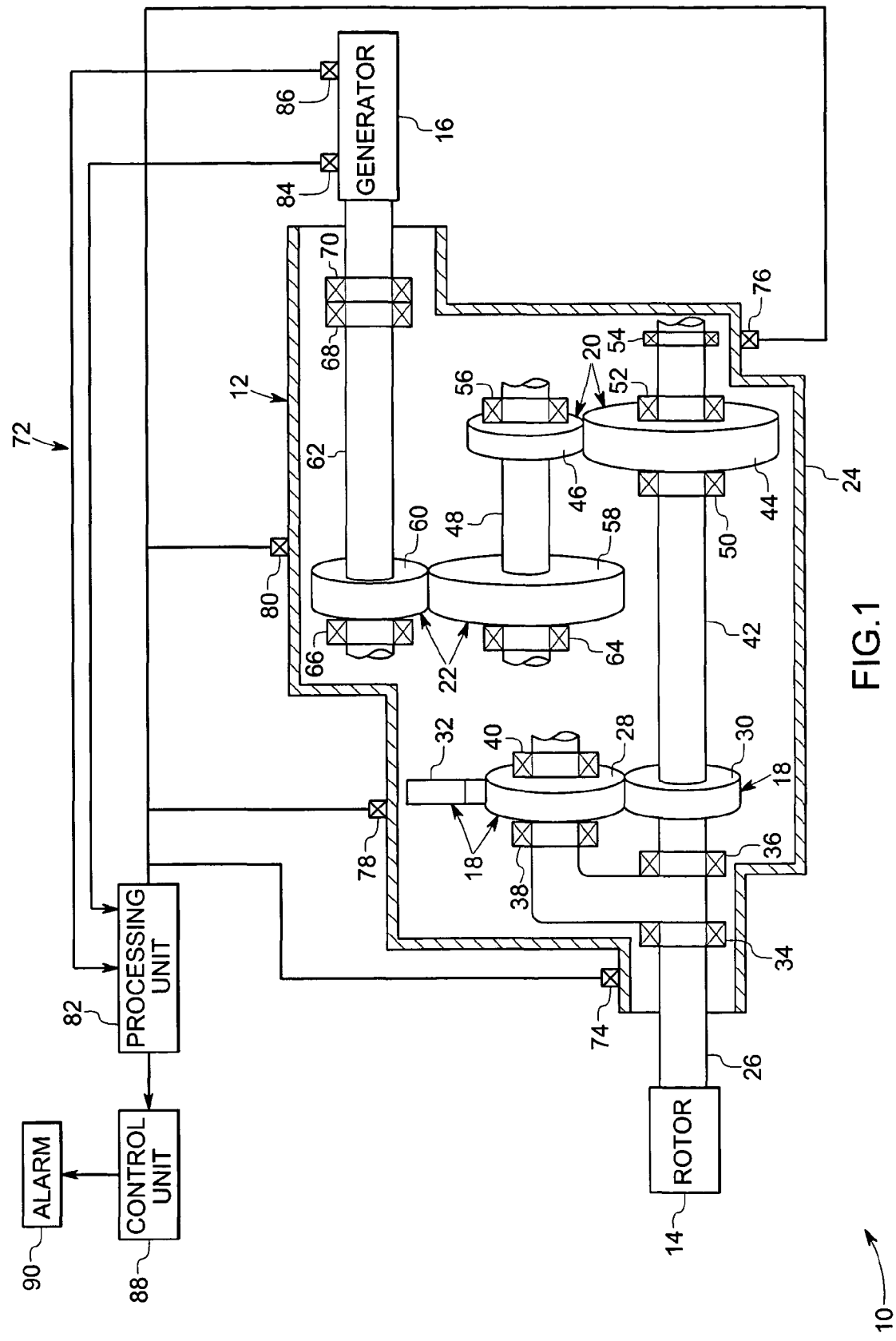
FIG. 1 is a diagrammatical view of a gearbox condition monitoring system of a rotating electric machine.

Referring generally to FIG. 1, a rotating electric machine is illustrated, and represented generally by reference numeral 10. In this embodiment, the rotating electric machine is a wind turbine. However the techniques described below are applicable to other power generation machines as well as various other applications. The wind turbine 10 may rotate at a speed of approximately 18 revolutions per minute. However, the speed may vary. In this embodiment, the wind turbine 10 has a gearbox 12 provided between a rotor 14 and a generator 16. The rotor 14 has a plurality of rotor blades (not shown). As the wind blows, the rotor 14 is rotated due to the force of the wind. The rotation of the rotor 14 is transmitted via the gearbox 12 to the rotor of the generator 16. The rotor 14 is designed to transfer wind energy into rotation efficiently. However, the rotor of the generator 16 is designed to operate at a much greater speed. The gearbox 12 is designed to increase the speed of rotation produced by the rotor 14 to the more desirable speed for driving the rotor of the generator 16. In this embodiment, the gearbox 12 has a gear ratio of 70 to 100.

In the illustrated embodiment, the gearbox 12 comprises a planetary gear set 18, an intermediate gear set 20, and a high-speed gear set 22 provided inside a gearbox casing 24. The rotor 14 is coupled via a rotor shaft 26 to the planetary gear set 18. The planetary gear set 18 comprises a planetary gear 28, a sun gear 30, and a ring gear 32. The ring gear 32 extends around the sun gear 30 and has teeth around its inner circumference. The sun gear 30 has teeth around its outer circumference. The teeth of the planetary gear 28 mesh with the teeth of the sun gear 30 and the ring gear 32. In addition, the planetary gear 28 is coupled to the rotor shaft 26. As the rotor 14 rotates the rotor shaft 26, the planetary gear 28 is driven around the sun gear 30 causing the sun gear 30 to rotate. The planetary gear set 18 is supported by a plurality of bearings 34, 36, 38, and 40.

The sun gear 30 is coupled via a first gear shaft 42 to the intermediate gear set 20. In this embodiment, the sun gear 30 is smaller than the planetary gear 28 and rotates at a greater speed than the rotor shaft 26. Therefore, the gear shaft 42 also rotates at a greater speed than the rotor shaft 26. The intermediate gear set 20 comprises a first intermediate gear 44 and a second intermediate gear 46 that cooperate to increase the speed of rotation further. The second intermediate gear 46 is coupled to a second gear shaft 48 coupled to the high-speed gear set 22. The first intermediate gear 44 is larger than the second intermediate gear 46 so that the second intermediate gear 46 rotates at a greater speed than the first intermediate gear 44. Therefore, the second gear shaft 48 rotates at a greater speed than the first gear shaft 42. The intermediate gear set 20 also is supported by a plurality of bearings 50, 52, 54, and 56.

The high-speed gear set 22 comprises a first high-speed gear 58 and a second high-speed gear 60 that cooperate to increase the speed of rotation still further. The second high-speed gear 60 is coupled to the generator 16 via an output shaft 62. The high-speed gear set 22 is supported via corresponding bearings 64, 66, 68, and 70. The first high-speed gear 58 is larger than the second high-speed gear 60. Therefore, the second high-speed gear 60 rotates at a greater speed than the first high-speed gear 58. Consequently, the output shaft 62 rotates at a greater speed than the second gear shaft 48. The generator 16 converts the rotational energy of the output shaft 62 into electricity.

A gearbox condition monitoring system 72 is provided to detect gear and bearing problems. The gearbox condition monitoring system 72 comprises a plurality of vibration sensors 74, 76, 78, 80 located at predetermined locations on the gearbox casing 24, as illustrated in FIG. 1. The vibration sensors are configured to detect vibrations within the gearbox 12 and to generate signals representative of the vibrations in the gearbox 12. A processing unit 82 is coupled to the plurality of vibration sensors and is configured to receive the signals from the vibration sensors. Furthermore, the processing unit 82 is operable to establish the location of a problem within the gearbox, whether it is in the planetary gear set 18, the intermediate gear set 20, the high-speed gear set 22, or the bearings. A problem, such as a chipped tooth in a gear, will cause a vibration within the gearbox 12. Because the speed of rotation increases from the planetary gear set 18 to the high-speed gear set 22, the frequency of a vibration produced by a problem in the high-speed gear set 22 will be greater than the frequency of a vibration caused by a problem in the intermediate gear set 20. Similarly, the frequency of a vibration produced by a problem in the intermediate gear set 20 will be greater than the frequency of a vibration caused by a problem in the planetary gear set 18.

The processing unit 82 comprises hardware circuitry and software that enables the processing unit 82 to process the signals and thereby establish the condition of the gearbox 12. As appreciated by those skilled in the art the processing unit 82 may include a range of circuitry types, such as a microprocessor, a programmable logic controller, a logic module, etc. In the illustrated embodiment, the processing unit 82 is programmed to perform a fast fourier transform of the signals representative of vibrations within the gearbox 12 and to compute plurality of dynamic energy indexes. The dynamic energy index is defined as the energy summation of a dynamic signal in a specified bandwidth of frequencies. Each dynamic energy index is computed by a summation of squares of amplitudes of vibrations at a predetermined bandwidth frequency. For a varying excitation condition, the dynamic energy index is typically normalized to reduce the variation.

The gearbox condition monitoring system 72 also comprises a speed sensor 84 and a power sensor 86 coupled to the processing unit 82. The speed sensor 84 is configured to detect the speed of the output shaft 62 and the power sensor 86 is configured to detect the output power of the generator 16. The output power of the generator 16 is used by the processor unit 82 to normalize the dynamic energy indexes.

In the illustrated embodiment, the processing unit 82 establishes four dynamic energy indexes, provided below as equations (1)-(4). Each dynamic energy index is established for a specific frequency range of vibrations. In addition, each frequency range of vibrations corresponds to the vibrations that would be produced by one of the gear sets or the bearings. For example, the planetary gear set 18 rotates at a certain rotational speed. Therefore, the vibrations produced by the planetary gear set 18 are expected to fall within a frequency band related to the rotational speed of the planetary gear set 18. Similarly, the gears of the high-speed gear set 22 rotate at a greater rotational speed. Therefore, the vibrations produced by the high-speed gear set 22 have a greater frequency than the vibrations produced in the planetary gear set 18.

The first dynamic energy index, identified below as DEI_fz1, corresponds to the planetary gear set 18. The second dynamic energy index, identified below as DEI_fz2, corresponds to the intermediate gear set 20. The third dynamic energy index, identified below as DEI_fz3, corresponds to the high-speed gear set 22. Finally, the fourth dynamic energy index, identified below as DEI_high, corresponds to the plurality of bearings.

$$\text{DEI\_fz1} = \frac{\sum_{f_i=Low_1}^{High_1} A^2(f_i)}{\text{Output power}} \tag{1}$$

$$\text{DEI\_fz2} = \frac{\sum_{f_i=Low_2}^{High_2} A^2(f_i)}{\text{Output power}} \tag{2}$$

$$\text{DEI\_fz3} = \frac{\sum_{f_i=Low_3}^{High_3} A^2(f_i)}{\text{Output power}} \tag{3}$$

$$\text{DEI\_high} = \frac{\sum_{f_i=Low_4}^{High_4} A^2(f_i)}{\text{Output power}} \tag{4}$$

where:

DEI_fz1 is the dynamic energy index of the planetary gear set;

DEI_fz2 is the dynamic energy index of the intermediate gear set;

DEI_fz3 is the dynamic energy index of the high-speed gear set;

DEI_high is the dynamic energy index of the bearings;

A ($f_i$) is the amplitude in the frequency domain of the vibration signals at frequency fi;

Output power is the generator output power;

$Low_1$ and $High_1$ are the low frequency and the high frequency boundaries respectively, for the first dynamic energy index;

$Low_2$ and $High_2$ are the low frequency and the high frequency boundaries respectively, for the second dynamic energy index;

$Low_3$ and $High_3$ are the low frequency and the high frequency boundaries respectively, for the third dynamic energy index; and $Low_4$ and $High_4$ are the low frequency and the high frequency boundaries respectively, for the fourth dynamic energy index.

Preferably, the frequency band for the dynamic energy indexes are exclusive, i.e., there is no overlap between the frequency bands. Thus, the vibrations that are produced effect only one dynamic energy index. In this embodiment, Low1 corresponds to a frequency of 20 Hz and High1 corresponds to a frequency of 130 Hz. Low2 corresponds to a frequency of 140 Hz and High2 corresponds to a frequency of 550 Hz. Low3 corresponds to a frequency of 560 Hz and High3 corresponds to a frequency of 3 KHz. Finally, Low4 corresponds to a frequency of 4 kHz and High4 corresponds to the highest frequency signal detectable by the system. These frequency bands may vary for many reasons, such as the gear sets used and the detection equipment utilized.

In the illustrated embodiment, the gearbox condition monitoring system 72 also comprises a separate processor-based control unit 88 coupled to the processing unit 82. However, the processor-based control unit 88 and the processing unit 82 may be combined in a single device. The processor-based control unit 88 is configured to analyze the normalized energy indexes and to detect gear and bearing faults based on the analysis of the normalized dynamic energy indexes. The control unit 88 may also store programming code, as well as parameters and values to enable the unit 88 to perform its desired functions. The control unit 88 is coupled to an alarm 90 configured to generate a warning signal when a fault is detected in the gears or bearings. In general, the warning signal may provide a simple status output, or may be used to activate or set a flag, such as an alert, indicating that the gearbox is in need of attention or will be in need of attention based upon its current state or trend in its state.

Figure 2:
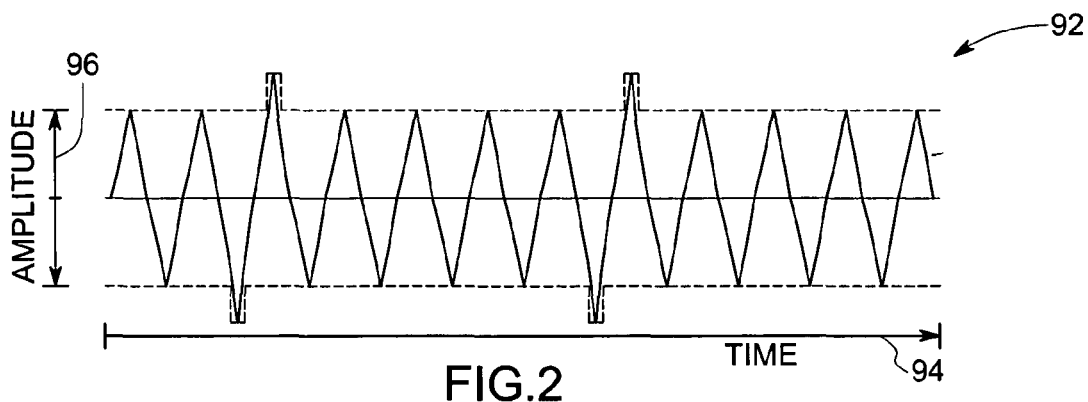
FIG. 2 is a diagrammatical view illustrating the effect of fault distribution on side band pattern due to local fault.
Figure 3:
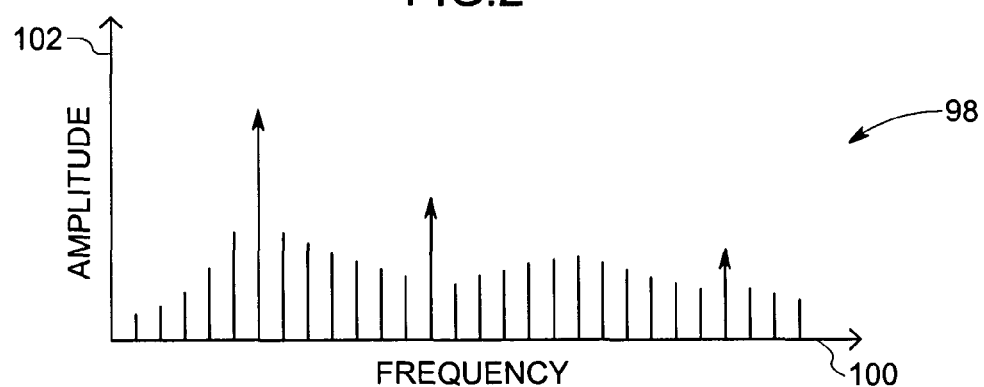
FIG. 3 is a diagrammatical view of a amplitude spectrum due to local fault.
Figure 4:
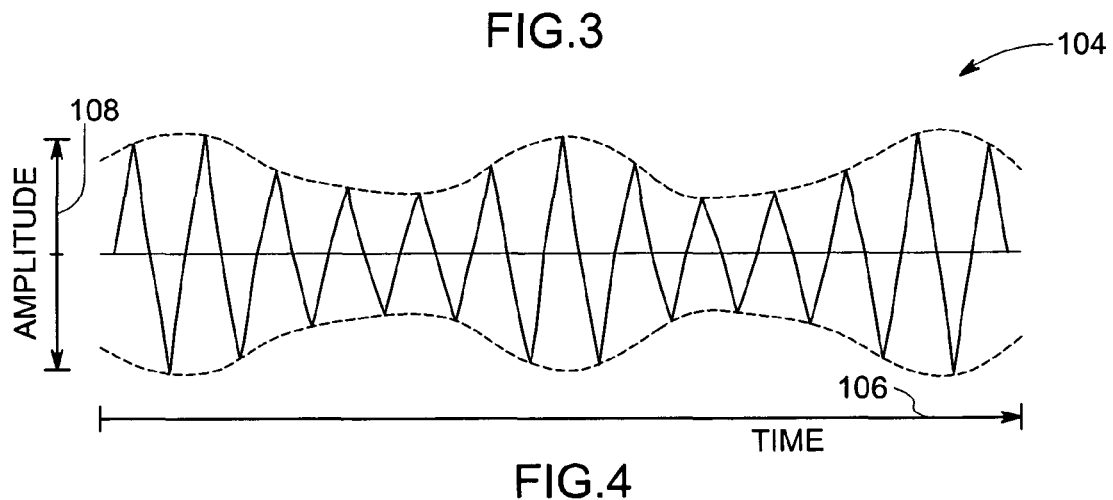
FIG. 4 is a diagrammatical view illustrating the effect of fault distribution on side band pattern due to distributed fault.

Referring generally to FIG. 2-5, the meshing of gears against one another produces vibrations within the gearbox. The frequency of the vibrations will be affected by the frequency at which the gears mesh. However, problems or faults in the gears or bearings of the gearbox may cause or increase the vibrations produced within the gearbox. Different types of problems in the gears will produce different vibration patterns that may be detected by the vibration sensors 74, 76, 78, and 80. A local fault, such as a chipped tooth in a gear, may generate vibrations at frequencies around the tooth meshing frequency and its harmonics. Referring generally to FIG. 2, a chart of a vibration signal produced from a local fault is illustrated, and represented generally by reference numeral 92. The x-axis of the chart, represented by reference numeral 94, represents time. The y-axis, represented by reference numeral 96, represents the amplitude of the vibration signal. FIG. 3 illustrates the vibration signal as a function of frequency, and is represented generally by reference numeral 98. The x-axis of the chart, represented by reference numeral 100, represents frequency. The y-axis, represented by reference numeral 102, represents the amplitude of the vibration signal. The amplitude of the vibrations is greatest at the gear-meshing frequency, with smaller peaks at the harmonic frequencies of the gear-meshing frequency.

Figure 5:
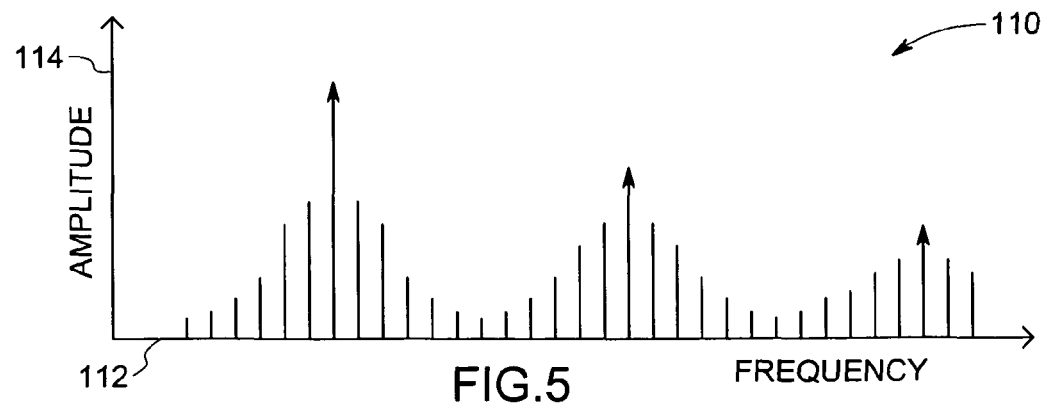
FIG. 5 is a diagrammatical view of a amplitude spectrum due to distributed fault.

A distributed fault, such as worn gear teeth, produces vibrations that are less abrupt than local faults. As a result, the amplitude of the vibrations that are produced by distributed faults have a less abrupt peak and are distributed over a range of frequencies. An example of a vibration signal produced by a distributed fault is illustrated, and represented generally by reference numeral 104. The x-axis of the chart, represented by reference numeral 106, represents time. The y-axis, represented by reference numeral 108, represents the amplitude of the vibration signal. FIG. 5 illustrates the vibration signal as a function of frequency, and is represented generally by reference numeral 110. The x-axis of the chart, represented by reference numeral 112, represents frequency. The y-axis, represented by reference numeral 114, represents the amplitude of the vibration signal.

A bearing related defect typically generates a series of impulsive excitations to the entire machine. Therefore, the high frequency component of the vibration signal may significantly increase. Thus, a high frequency domain energy index may be useful to detect the existence of a bearing defect.

As noted above, local and distributed faults may increase the amplitude of vibrations produced by gears within a machine. As a result, the area under the curves illustrated in FIGS. 3 and 5 will increase when a local or distributed fault occurs in the gears. The frequency of the vibrations depends upon the location of the fault. For example, a fault in the planetary gear set 18 increases the amplitude of vibrations at a lower frequency. A fault in the intermediate gear set 20 produces a vibration at a relatively higher frequency because the speed of rotation of the intermediate gear set 20 is greater. Similarly the frequency of a vibration produced from a fault in the high-speed gear set 22 may be higher compared to that of the intermediate gear set 20. Finally a fault in the bearings generates vibrations at a higher frequency compared to that of the gear faults.

The normalized dynamic energy indexes enable the system 72 to identify the source of fault based on the frequency of the vibrations produced within the gearbox 12. Each normalized dynamic energy index corresponds to a defined frequency band, which in turn corresponds to a particular gear set or the bearings. The normalized dynamic energy index is compared to predetermined reference values to determine if a fault is present in either the gear sets or the bearings. Generally, if there is a fault in the gears or the bearings, the area under the curves illustrated in FIGS. 3 and 5, depending on the type of fault, will increase. For example, if the area under the curve in the frequency range corresponding to the planetary gear set 18 increases due to a fault in the planetary gear set, then the first energy index (DEI_fz1) will increase. However, the other dynamic energy indexes, which correspond to different frequency bands, may not increase, or may increase to a lesser degree. As a result, the system 72 is able to identify the location of the fault to the planetary gear set 18 based on the dynamic energy indexes. Similarly, if the fault occurs in the intermediate gear set 20, then the second energy index (DEI_fz2) will increase. If the fault occurs in the high-speed gear set 22, the third energy index (DEI_fz3) will increase. Finally, if the fault occurs in the bearings, the fourth energy index (DEI_high) will increase.

Figure 6:
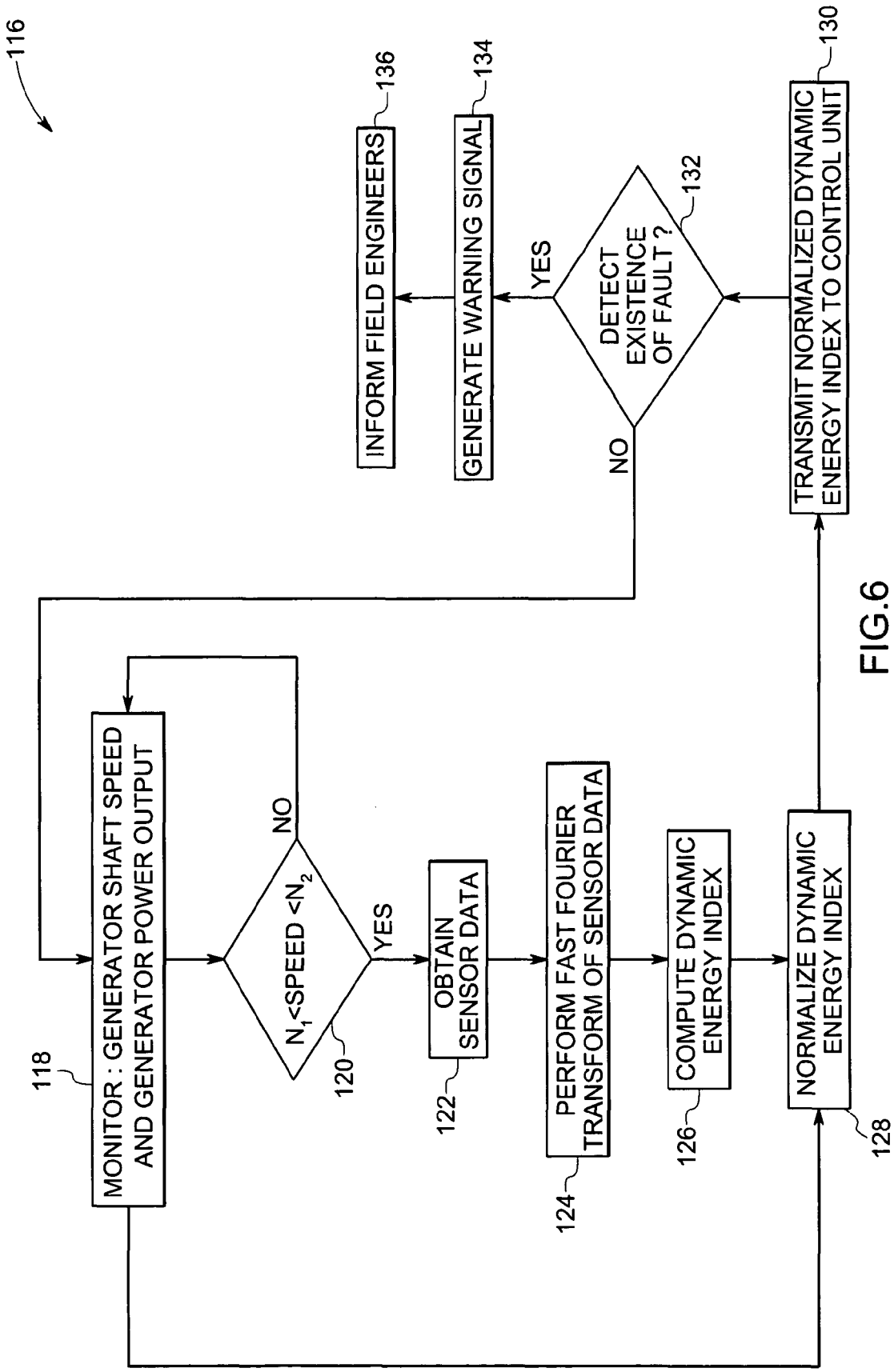
FIG. 6 is a flow chart illustrating a method of gearbox condition monitoring for the rotating electric machine of FIG. 1.

Referring generally to FIG. 6, a method of monitoring a gearbox condition of wind turbine 10 utilizing the gearbox condition monitoring system 72, and the dynamic energy indexes, is illustrated, and represented generally by reference numeral 116. The method 116 comprises monitoring the output shaft speed and generator power output as represented by block 118. The method may also comprise monitoring whether the output shaft speed is maintained between predetermined speed limits N1 and N2, as represented by block 120. In the illustrated embodiment, the speed limits are usually maintained between 1250 revolutions per minute and 1470 revolutions per minute. If the output shaft speed is maintained between the predetermined limits, sensor data is obtained from the vibration sensors 74, 76, 78, 80, as represented by block 122. However, if the speed is outside the frequency band, the system 72 does not use the sensor data. The sensor data is indicative of the vibrations generated by plurality of components in the gearbox. The method may further comprise performing a fast fourier transform of the sensor data via the processing unit 82, as represented by block 124. The method may also comprise computing the dynamic energy indexes, as represented by block 126. The illustrated method also comprises normalizing the computed dynamic energy indexes by the output power of the turbine 10, as represented by block 128. The method may further comprise transmitting the normalized dynamic energy indexes to the control unit 88, as represented by block 130. The method may also comprise analyzing the normalized dynamic energy indexes to determine the existence of gear or bearing faults, as represented by block 132. The analysis may typically comprise identifying the source of fault based on the normalized dynamic energy indexes. If the DEI for a gear set or bearing exceeds the predetermined reference value, it is an indication of a fault within the particular gear set or bearing. The method may also further comprise activating an alarm 90 to generate a warning signal when a fault is detected in the gears or bearings, as represented by block 134. The method may also further comprise informing the field engineers to perform a necessary corrective action when a fault is detected in the gears or bearings, as represented by block 136.

Thus the above-mentioned technique is suitable for gearbox of different configurations because the output shaft speed and power output is monitored and the dynamic energy index is normalized to reduce variation. Moreover the speed variation during operation is considered for detecting gear and bearing faults. The DEI technique enables to distinguish gear and bearing faults based on the frequency of vibrations. Thus a frequency domain energy index enables to identify bearing defect and another particular domain energy index may be useful to identify gear fault.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gearbox monitoring system, comprising:
at least one vibration sensor coupleable to a gearbox housing a plurality of gear sets, wherein the at least one vibration sensor is operable to generate a signal representative of gearbox vibration; and
a processing unit operable to identify a specific gear set within the plurality of gear sets as a location of a fault based on frequency and a summation of squares of amplitude of the signal representative of vibration; wherein the processing unit is programmed to establish a plurality of dynamic energy indexes, each dynamic energy index corresponding to a vibration energy in a frequency band; wherein the summation of squares of the amplitude of the signal representative of vibration is computed over a defined frequency band;
a power sensor operable to provide a signal representative of output power of a generator coupled to the gearbox, to the processing unit to enable the processing unit to normalize the plurality of dynamic energy indexes based on the generator output power.

2. The system as recited in claim 1, wherein each dynamic energy index is based on the summation of squares of the amplitude of the signal representative of gearbox vibration for the frequency band corresponding to each dynamic energy index.

3. The system as recited in claim 1, wherein the processing unit is operable to identify the specific gear set within the plurality of gear sets as the location of a fault by identifying when each normalized dynamic energy index exceeds a defined value.

4. The system of claim 3, further comprising a speed sensor coupled to the processing unit and operable to provide a signal representative of speed of an output shaft coupled to the generator.

5. The system as recited in claim 3, further comprising an alarm, wherein the processing unit provides a signal to the alarm when a normalized dynamic energy index exceeds the defined value.

6. A gearbox monitoring system, comprising:
at least one vibration sensor coupleable to a system comprising a gear assembly having at least one gear set, wherein the at least one vibration sensor is operable to generate a signal representative of gear vibration; and
a processing unit coupled to the at least one vibration sensor, wherein the processing unit is operable to establish a dynamic energy index over a defined frequency band of the gear vibrations and the processing unit is operable to produce a signal when the dynamic energy index exceeds a reference value;
wherein the gear assembly comprises a plurality of gear sets, and wherein the processing unit is operable to establish a plurality of dynamic energy indexes, each dynamic energy index corresponding to a specific frequency band of the gear vibrations; wherein each specific frequency band of the gear vibrations corresponds to a range of vibrations produced by a specific gear set in the plurality of gear sets;
a power sensor operable to provide a signal representative of output power of a generator coupled to a gearbox of the gear assembly, to the processing unit to enable the processing unit to normalize the plurality of dynamic energy indexes based on the generator output power.

7. The system as recited in claim 6, wherein the processing unit is operable to identify a specific gear set in the plurality of gear sets as producing an abnormal vibration when each dynamic energy index corresponding to the specific gear set exceeds a reference value.

8. The system as recited in claim 6, comprising a plurality of vibration sensors disposed at various locations on the gear assembly and coupled to the processing unit.

9. The system as recited in claim 6, wherein each dynamic energy index is based on a summation of squares of amplitude of the signal representative of gear vibration for the frequency band corresponding to each dynamic energy index.

10. A system, comprising:
a plurality of gear sets;
a plurality of bearings operable to support the plurality of gear sets;
at least one vibration sensor operable to provide a signal representative of vibration of at least one or more of the plurality of gear sets; and
a processing unit coupled to the at least one vibration sensor, wherein the processing unit is operable to establish a plurality of dynamic energy indexes of the signal representative of vibration of the at least one or more of the plurality of gear sets, each of the plurality of dynamic energy indexes corresponding to a specific frequency band of vibrations; wherein each dynamic energy index comprises a summation of the squares of the amplitude of vibrations over the specific frequency band of vibrations corresponding to each dynamic energy index; wherein the processing unit is operable to identify a specific gear set within the plurality of gear sets as a location of a fault based on the plurality of dynamic energy indexes;

a power sensor coupled to the processing unit and operable to provide a signal representative of output power of a generator drivingly coupled to the plurality of gear sets, wherein the processing unit is operable to normalize the plurality of dynamic energy indexes based on the output power of the generator drivingly coupled to the plurality of gear sets.

11. The system as recited in claim 10, wherein the processing unit is operable to perform a fast fourier transform of the signal representative of vibration of the at least one or more of the plurality of gear sets.

12. The system as recited in claim 11, further comprising an alarm, wherein the processing unit provides a signal to the alarm unit to alarm when a normalized dynamic energy index exceeds the reference value representative of a vibration limit.

13. The system as recited in claim 10, wherein the processing unit is operable to compare each of the plurality of normalized dynamic energy indexes to a reference value representative of a vibration limit.

14. The system of claim 10, further comprising a speed sensor coupled to the processing unit and operable to provide a signal representative of speed of an output shaft coupled to the generator.

15. The system as recited in claim 10, wherein the system comprises a gearbox having the gear assembly.

16. A wind turbine comprising:
a rotor;
a generator operable to generate power;
a gear assembly comprising a plurality of gear sets and plurality of bearings to support the gear sets provided between the rotor and the generator; and
a gear assembly monitoring system comprising:
at least one vibration sensor operable to provide a signal representative of vibrations of the gear assembly; and
a processing unit coupled to the at least one sensor; wherein the processing unit is operable to establish a plurality of dynamic energy indexes of the signal representative of vibrations of the gear assembly, each of the plurality of dynamic energy indexes corresponding to the vibration energy in a frequency band; wherein each dynamic energy index comprises a summation of the squares of the amplitude of vibrations over the specific frequency band of vibrations corresponding to each dynamic energy index; wherein the processing unit is operable to identify a specific gear set within the plurality of the gear sets as a location of a fault based on the plurality of dynamic energy indexes;
a power sensor coupled to the processing unit and operable to provide a signal representative of output power of the generator drivingly coupled to the plurality of gear sets, wherein the processing unit is operable to normalize the plurality of dynamic energy indexes based on the output power of the generator drivingly coupled to the plurality of gear sets.

17. The wind turbine of claim 16, wherein the gear assembly monitoring system further comprises a speed sensor coupled to the processing unit and operable to provide a signal representative of speed of an output shaft coupled to the generator.

18. The wind turbine of claim 16, wherein the processing unit is operable to perform a fast fourier transform of the signal representative of vibration of the gear assembly.

19. The wind turbine of claim 16, wherein the processing unit is operable to compare each of the plurality of normalized dynamic energy indexes to a reference value representative of a vibration limit.

20. The wind turbine of claim 18, wherein the gear assembly monitoring system further comprises an alarm, wherein the processing unit provides a signal to the alarm unit to alarm when a normalized dynamic energy index exceeds the reference value representative of a vibration limit.

21. The wind turbine of claim 16, wherein the gear assembly comprises a gearbox provided between the rotor and the generator.

22. A method of identifying an abnormal vibration in a gear system, comprising:
detecting gear vibrations with at least one vibration sensor operable to generate a signal representative of the detected gear vibrations;
processing the signal representative of the detected vibrations of gears and bearings to compute at least one energy index;
normalizing the at least one energy index; wherein normalizing comprises normalizing the at least one energy index is based on output power of a generator coupled to the gear system;
comparing the at least one normalized energy index to a reference value to establish if gear vibrations are normal or abnormal; and
outputting an alarm to a user if the gear vibrations are abnormal;
wherein processing the signal comprises computing the at least one energy index by a summation of the squares of the amplitude of the gear vibrations within a defined frequency band.

23. The method of claim 22, further comprising monitoring speed of an output shaft coupled to the generator.

24. The method as recited in claim 22, wherein processing the signal further comprises computing a plurality of energy indexes, each energy index corresponding to an exclusive frequency band.

25. The method as recited in claim 24, further comprising comparing the at least one normalized energy index to a reference value to establish if gear vibrations are normal or abnormal.

26. The method as recited in claim 22, further comprising generating a warning signal when the at least one normalized energy index exceeds the reference value.

27. The method of claim 22, wherein each energy index comprises a dynamic energy index.

28. A non-transitory computer-readable medium having a computer program to enable a processor-based device to monitor the operating condition of a gear system, the computer program comprising:
programming instructions stored in the non-transitory computer-readable medium, wherein the programming instructions enable the processor-based device to compute a dynamic energy index for each of a plurality of frequency bands of a signal representative of vibrations produced by the gear system;

programming instructions stored in the non-transitory computer-readable medium that enable the processor-based device to identify a specific gear set in the gear system that is producing an abnormal vibration based on the plurality of dynamic energy indexes; each dynamic energy index corresponding to a specific frequency band of the gear vibrations; wherein each specific frequency band of the gear vibrations corresponds to a range of vibrations produced by a specific gear set in the plurality of gear sets; and programming instructions stored in the non-transitory computer-readable medium; wherein the programming instructions generate a warning to a user when the abnormal vibration is identified in the gear system;

programming instructions stored in the non-transitory computer-readable medium, wherein the programming instructions enable a power sensor operable to provide a signal representative of output power of a generator coupled to the gearbox, to the processor-based device to enable the processor-based device to normalize the plurality of dynamic energy indexes based on the generator output power;

wherein each dynamic energy index is based on a summation of squares of amplitude of the signal representative of gear system vibration for a frequency band corresponding to each dynamic energy index.

\* \* \* \* \*